United States Patent Office 3,542,844
Patented Nov. 24, 1970

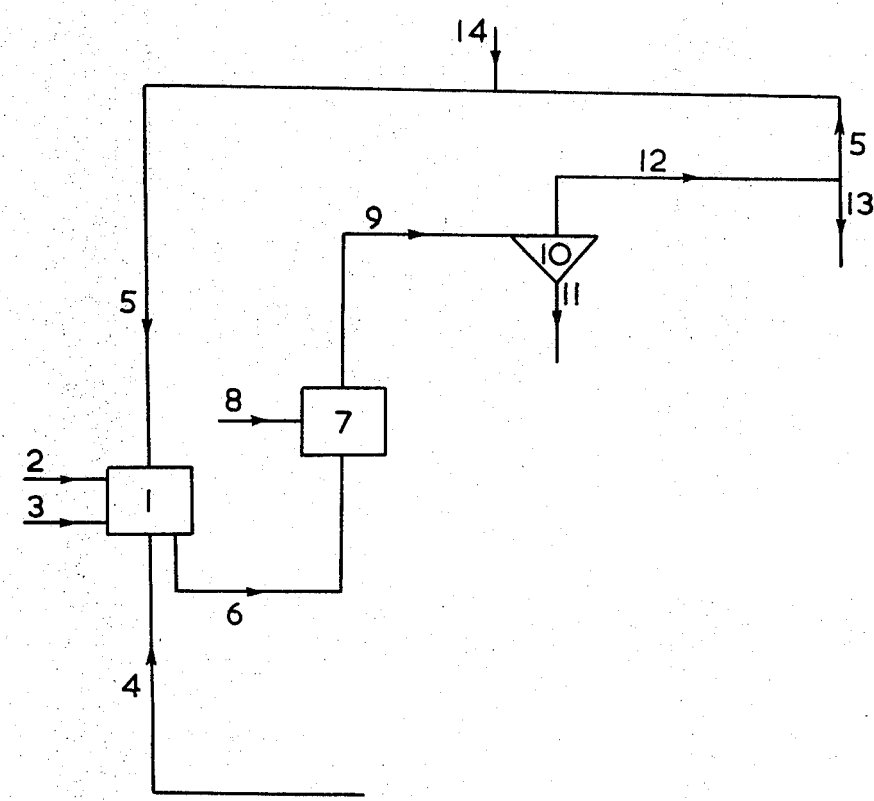

3,542,844
PROCESS FOR REMOVING SODIUM BICARBONATE FROM A REACTION PRODUCT CONTAINING ADIPONITRILE
Gordon Diprose, Runcorn, and Albert Stanley Gomm, Manchester, England, assignors to Imperial Chemical Industries Limited, Millbank, London, England, a corporation of Great Britain
Filed Feb. 19, 1968, Ser. No. 706,344
Claims priority, application Great Britain, Apr. 10, 1967, 16,359/67
Int. Cl. C07c 121/26, 121/20
U.S. Cl. 260—465.8    6 Claims

ABSTRACT OF THE DISCLOSURE

Sodium bicarbonate is removed from a suspension thereof in an organic phase by treating the suspension with sodium carbonate and separating a solid which is a mixture or chemical combination of sodium bicarbonate and sodium carbonate. The method is particularly applicable to the suspension of sodium bicarbonate in an organic phase containing a hydrodimer of an alpha-beta-mono-olefinic nitrile or carboxylate which is obtained when the olefinic starting material is hydrodimerised by treating with sodium amalgam in the presence of a proton source and a major proportion of polar organic solvent at an apparent pH which is maintained in the range 7 to 11.5 by addition of carbon dioxide.

---

This invention relates to the removal of sodium bicarbonate from a suspension thereof in an organic phase.

When sodium bicarbonate is precipitated in an organic phase (for example, when carbon dioxide is used as a neutralising or acidic buffering agent in a reaction in which sodium hydroxide is formed) the sodium bicarbonate is often obtained as a suspension in the form of extremely fine particles and the physical form of the particles can cause difficulties in the subsequent removal thereof from the organic phase.

We have now found that improved control over the physical form of the solids to be removed may be achieved by treating the suspension with sodium carbonate.

Thus according to the present invention there is provided a process for removing sodium bicarbonate from a suspension thereof in an organic phase which comprises treating the said suspension with sodium carbonate and separating a solid comprising a mixture or chemical combination of sodium bicarbonate and sodium carbonate.

The treatment of the suspension preferably comprises addition of sodium carbonate and, if necessary, water in the proportions required to convert at least part of the sodium bicarbonate to sodium sesquicarbonate,

$$Na_2CO_3 \cdot NaHCO_3 \cdot 2H_2O$$

It is preferred to add at least 0.1 mole of sodium carbonate for each mole of sodium bicarbonate and if necessary to add sufficient water to provide at least 0.2 mole water per mole of sodium bicarbonate. It is especially advantageous if substantially all the sodium bicarbonate is converted into sodium sesquicarbonate.

The treatment may be carried out over a wide temperature range depending on the solvent used but in general it is preferred to carry it out in the range 20° C. to 80° C. The range 30° C. to 60° C. is especially preferred.

It is preferred to treat the suspension by adding sodium carbonate to a stirred vessel containing the suspension.

The treatment with sodium carbonate may be carried out batchwise or continuously.

After treatment of the suspension with sodium carbonate, the mixture or combination of sodium carbonate and sodium bicarbonate is removed, for example centrifugally or by filtration; if necessary the separated organic phase may be treated, for example by distillation and/or solvent extraction, to recover the desired components therefrom.

The process described herein finds particular application in the treatment of suspensions of sodium bicarbonate produced in the hydrodimerisation of alpha-beta-monoolefinic nitriles or carboxylates as described for example in copending U.S. application Ser. No. 579,885, filed Sept. 16, 1966 wherein the amalgam is interacted with a non-amalgm phase comprising the alpha-beta-mono-olefin starting material, a proton source and a major proportion of a polar organic solvent, the apparent pH of the non-amalgam phase preferably being maintained in the range 7 to 11.5 by addition of carbon dioxide. In this hydrodimerisation process the use of sodium amalgam as a reactant and carbon dioxide as an acidic buffering agent leads to the formation of a suspension of sodium bicarbonate in the non-amalgam phase and it is desirable to separate sodium bicarbonate before recovery of the hydrodimer product from the non-amalgam phase. The hydrodimerisation process is especially applicable to the manufacture of adiponitrile by the hydrodimerisation of acrylonitrile. Other alpha-beta-mono-olefinic nitriles may be used as starting materials, including alkenyl nitriles containing up to 4 carbon atoms in the alkenyl group. Alpha-beta-mono-olefinic carboxylates which may be used as starting materials include esters of alpha-beta-mono-olefinic mono- or di-carboxylic acids with alkanols containing up to 4 carbon atoms, for example methyl acrylate and ethyl acrylate.

The proton source is preferably water although lower alcohols (for example methanol and ethanol) which do not themselves react with acrylonitrile to form undesired by-products may be used; mixtures of water and alcohols may also be used.

The hydrodimerisation process is preferably carried out in the presence of a salt capable of forming alkylated cations in the non-amalgam phase; suitable salts are, for example, those described in the specification of Netherlands application No. 6504863 or in the aforementioned U.S. application Ser. No. 579,885. Thus the salt may form alkylated ammonium, phosphonium or sulphonium cations, for example tetra-alkyl ammonium ions, tetra-alkyl phosphonium ions, or tri-alkyl sulphonium ions. The preferred salts are tetra-alkyl ammonium salts and especially preferred are tetra-alkyl ammonium salts in which the N-atom is attached to 3 or 4 lower alkyl groups, for example groups containing from 1 to 4 (preferably 1 or 2) carbon atoms; thus tetra-ethyl ammonium salts and methyl tri-ethyl ammonium salts are among the preferred salts. The salt may comprise the alkylated cation in association with a wide variety of anions; halides and p-toluene sulphonates are preferred on solubility grounds.

The polar organic solvent should be unreactive towards the other components of the non-amalgam phase and towards the amalgam. Suitable solvents include acetonitrile, dioxan, dimethylacetamide, dimethylformamide, dimethyl sulphoxide and tetrahydrofuran. The hydrodimer product (for example adiponitrile) may itself be regarded as a polar organic solvent and the hydrodimer content of the recycled mixture is to be taken into account in calculating the proportion of total polar organic solvent in the non-amalgam phase.

The salt forming alkylated cations preferably comprises at least 0.2 mole percent of the non-amalgam phase.

The non-amalgam phase preferably contains a proportion of the alpha-beta-mono-olefinic nitrile or carboxylate within the range 2.5 to 20 mole percent, a proportion of the proton source within the range 1 to 30 mole percent, preferably from 2 to 20 mole percent, and a proportion of salt forming alkylated cations within the range 0.2 to 8 mole percent, the remainder consisting essentially of polar organic solvent.

The proportions of the components of the non-amalgam phase are calculated excluding the metal salt suspended in the said phase.

The term "pH" as applied to the non-amalgam phase denotes the apparent pH measured using conventional instruments or indicators; the apparent pH may not have the same significance in terms of hydrogen ion concentration as in wholly aqueous systems but is a convenient measure of the degree of alkalinity of the non-amalgam phase.

The hydrodimerisation reaction is conveniently carried out at substantially atmospheric pressure but a wide range of pressure and temperature may be used, depending upon the particular olefinic starting material and upon the solvent employed. In general, it is preferred to carry out the reaction at a temperature within the range from 10° C. to 55° C., a temperature range of from 30° C. to 45° C. being preferred. The reaction is exothermic and the reaction temperature may conveniently be controlled by adjusting the rate of introduction of reactants.

Intimate contact between the amalgam and the non-amalgam phase is desirable and this may be achieved using a reactor wherein the amalgam is dispersed throughout the non-amalgam phase by causing the non-amalgam phase to pass upwardly through a reaction zone into which fresh amalgam is continuously supplied. The reaction may be carried out, for example, in the apparatus described in Dutch patent application No. 6617641.

The rate of introduction of reactants is arranged so that substantially all the amalgam is decomposed in the reaction zone. The mercury formed (and any residual amalgam) is separated from the rest of the mixture leaving the reaction zone, for example by a cyclone separator.

The process described herein is especially applicable when the hydrodimerisation process is carried out as described in copending U.S. application S.N. 706,402, a suspension of sodium bicarbonate being maintained in the reaction zone and a portion of the non-amalgam phase containing sodium bicarbonate being recycled to the reaction zone; the treatment with sodium carbonate, as described herein, may then be applied to that portion of the suspension which is withdrawn for recovery of the reaction products.

When the hydrodimerisation process is carried out as described in said U.S. application S.N. 706,402 the concentration of the suspension of sodium bicarbonate is preferably at least 0.5% by weight of the total weight of the sodium bicarbonate and the non-amalgam phase; a concentration of at least 2% by weight, for example 5% to 20%, is especially preferred. As the concentration is increased above about 40% it may become difficult to maintain circulation of the suspension.

The required concentration of the suspension is preferably achieved by recycling at least 1 part by weight of the non-amalgam phase for each part by weight of the non-amalgam phase removed for recovery of the reaction products. It is especially preferred to recycle at least 5 parts by weight (for example from 10 to 100 parts) of the non-amalgam phase for each part removed. (The proportion of the non-amalgam phase to be recycled is calculated excluding the sodium bicarbonate suspended in the said phase.)

By hydrogenation of adiponitrile hexamethylenediamine is obtained. The latter is a valuable intermediate for the manufacture of synthetic linear polyamides (suitable for melt spinning into fibres) by polycondensation with dicarboxylic acids, especially adipic acid which gives polyhexamethylene adipamide (nylon 6,6).

The invention is illustrated but not limited by the following examples in which all parts, unless otherwise stated, are by weight.

EXAMPLE 1

FIG. 1 is a diagrammatic flowsheet of a hydrodimerisation process producing a suspension of sodium bicarbonate in the non-amalgam phase. The mixing vessel 1 is continuously fed with acrylonitrile (5.2 parts/hour including recycled acrylonitrile) through line 2, with acetonitrile (37.5 parts/hour including recycled acetonitrile) through line 3, with a 41% w./w. solution of methyl triethyl ammonium chloride in water (5.8 parts/hour) through line 4, and with a recycled mixture of reaction products containing sodium bicarbonate in suspension (1600 parts/hour) through line 5. Carbon dioxide is introduced through line 14 to line 5. The resulting mixture flows through line 6 into the hydrodimerisation reactor 7 where it passes upwardly through a reaction zone into which sodium amalgam (650 parts/hour) is continuously fed through line 8. The sodium amalgam contains 2 parts sodium per 1002 parts total amalgam. The average residence time of the mixture in the reactor is 2 seconds. The rate of introduction of $CO_2$ is controlled to maintain an apparent pH in the reaction zone of 8.5. The heat evolved in the reaciton is such that the temperature of the mixture of reaction products (containing sodium bicarbonate in suspension) is 40° C. The mixture is passed along line 9 to the cyclone separator 10 where entrained mercury is separated and removed through line 11. After removal of mercury, the mixture of reaction products (containing sodium bicarbonate in suspension) is passed along line 12 and is then split into two portions, 1600 parts/hour being returned along line 5 to the mixing vessel 1 and 52 pars/hour being bled-off through line 13 for separation of sodium bicarbonate and recovery of the product adiponitrile.

On establishment of steady state conditions, the mixture passing along line 12 (and hence along line 13) consists of 10 parts of sodium bicarbonate in suspension in 100 parts of non-amalgam phase, the non-amalgam phase comprising the following:

|  | Percent w./w. |
|---|---|
| Acetonitrile | 79.2 |
| Adiponitrile | 5.8 |
| Acrylonitrile | 5.0 |
| Methyl triethyl ammonium chloride | 5.0 |
| Water | 5.0 |

200 ml. of the suspension bled through line 13 (containing 15.6 g. $NaHCO_3$) are treated in a stirred vessel by adding 19.7 g. sodium carbonate (the amount required for complete conversion of the sodium bicarbonate to sodium sesquicarbonate) and 20 g. water (three times the amount required for complete conversion of the sodium bicarbonate to sodium sesquicarbonate) over a period of 40 minutes. Further 200 ml. portions of the suspension are treated in the same way, except that the quantities of sodium carbonate and water are varied as shown in Table 1.

The filtration properties of the treated and untreated suspensions are compared using a standard laboratory filtration test. The treated suspension obtained as described is diluted with non-amalgam phase to give a suspension of the same concentration of solids as is present in the untreated suspension; 200 ml. of the diluted treated suspension are filtered through a 7.3 cm. diameter No. 4 sintered glass filter under an applied vacuum of 50 cm. Hg and the time required to complete the filtration is observed.

TABLE 1

| Sodium carbonate added, grams | Water added, grams | Time required for filtration, seconds |
|---|---|---|
| 19.7 | 10 | 20 |
| 19.7 | 20 | 15 |
| 19.7 | 30 | 10 |
| 14.8 | 20 | 21 |
| 8.8 | 20 | 24 |
| 5.0 | 20 | 42 |

By way of comparison, the untreated suspension filters in 800 seconds.

EXAMPLE 2

15 litres of a suspension of sodium bicarbonate in non-amalgam phase produced in a hydrodimerisation reaction of the type described in the first example pass through line 12 (and hence 13). It consists of 19.4 parts of sodium bicarbonate in 100 parts of non-amalgam phase.

The slurry is fed to a steam jacketed vessel stirred at 200 r.p.m. with a screw type stirrer and 1.1 litres of water are added. With the temperature held at 40° C., 1900 gms. of sodium carbonate (sufficient to convert all the bicarbonate to sesquicarbonate) are added gradually and the suspension stirred for 20 minutes, by which time conversion to sodium sesquicarbonate is complete.

Laboratory filter tests, based on the use of a 4.2 cm. diameter G4 sinter operating at a vacuum 200 mm. Hg, are used to compare the resistance of a filter cake of the solids before and after conversion to sesquicarbonate. These show that conversion to sesquicarbonate reduce the resistance from $1.9 \times 10^9$ c.g.s. units to $1.6 \times 10^8$ c.g.s. units.

We claim:

1. In a process for the manufacture of adiponitrile from acrylonitrile wherein sodium amalgam is interacted at a temperature within the range 10 to 55° C. with a non-amalgam phase comprising acrylonitrile, a proton source and a major proportion of a polar organic solvent which is unreactive towards the amalgam and the other components of the non-amalgam phase, the apparent pH being maintained in the range 7 to 11.5 by addition of carbon dioxide whereby a suspension of sodium bicarbonate tained in the reaction zone, and a portion of the non-amalgam phase, the improvement wherein the non-amalgam phase containing said sodium bicarbonate in suspension is treated at a temperature within the range 20° C. to 80° C. with sodium carbonate to form a solid comprising a mixture or chemical combination of sodium bicarbonate and sodium carbonate, the said solid is separated from the residue of the non-amalgam reaction product, and adiponitrile is recovered from the said residue.

2. The process of claim 1 in which there is added to the non-amalgam phase at a temperature of 20° C. to 80° C. at least 0.1 mole of sodium carbonate for each mole of sodium bicarbonate and sufficient water to provide at least 0.2 mole of water per mole of sodium bicarbonate, so as to convert at least a part of the sodium bicarbonate to sodium sesquicarbonate.

3. The process of claim 2 in which substantially all of the sodium bicarbonate is converted into sodium sesquicarbonate.

4. The process of claim 1 operated continuously in which a suspension of sodium bicarbonate of concentration at least 0.5% by weight of the total weight of the sodium bicarbonate and the non-amalgam phase is maintained in the reaction zone, and a portion of the non-amalgam reaction product containing sodium bicarbonate is recycled to the reaction zone and the remainder is treated with sodium carbonate, at least 1 part by weight of the non-amalgam reaction product being recycled for each part treated.

5. A continuous process according to claim 1 for the manufacture of adiponitrile from acrylonitrile which comprises reacting sodium amalgam in a reaction zone with a non-amalgam phase containing 2.5 to 20 mole percent of acrylonitrile, from 2 to 20 mole percent of water and from 0.2 to 8 mole percent of a tetra-alkyl ammonium salt in which the N-atom is attached to at least three lower alkyl groups, the remainder consisting essentially of said polar organic solvent, at an apparent pH which is maintained in the range 7 to 11.5 by addition of carbon dioxide, and at a temperature of from 30 to 45° C., the sodium bicarbonate formed by reaction of the carbon dioxide and the sodium remaining in suspension in the reaction mixture at a concentration of from 5 to 20% by weight, separating the mercury and any residual amalgam from the non-amalgam reaction product, withdrawing a portion of the non-amalgam reaction product containing sodium bicarbonate in suspension, adding sufficient sodium carbonate and water thereto at a temperature of 30° C. to 60° C. to convert substantially all the sodium bicarbonate to sodium sesquicarbonate, removing the solid sodium sesquicarbonate therefrom, and separating adiponitrile from the resulting liquid phase by distillation, and recycling the remainder of the non-amalgam reaction product to the reaction zone, from 10 to 100 parts of the non-amalgam reaction product being recycled for each part withdrawn.

6. The process of claim 1 in which the non-amalgam phase contains a proportion of acrylonitrile within the range 2.5 to 20 mole percent, a proportion of the proton source within the range 1 to 30 mole percent and a proportion of a tetraalkyl ammonium salt in which the N-atom is attached to at least three lower alkyl groups containing from 1 to 4 carbon atoms within the range 0.2 to 8 mole percent, the remainder consisting essentially of said polar organic solvent.

References Cited
UNITED STATES PATENTS 3,462,478    8/1969    Fanshawe   _____ 260—465.8

JOSEPH P. BRUST, Primary Examiner

U.S. Cl. X.R.

260—485